(12) United States Patent
Durairaj et al.

(10) Patent No.: US 12,499,269 B1
(45) Date of Patent: Dec. 16, 2025

(54) SYSTEM AND METHOD FOR PROTECTING PRIVACY OF DATA

(71) Applicant: United Services Automobile Association (USAA), San Antonio, TX (US)

(72) Inventors: Ravi Durairaj, San Antonio, TX (US); Will Kerns Maney, New York, NY (US); John D. McEachron, Boerne, TX (US); Nathan Lee Post, Rockport, TX (US); Nolan Serrao, Plano, TX (US); Mark Paxman Warnick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 240 days.

(21) Appl. No.: 18/129,477

(22) Filed: Mar. 31, 2023

(51) Int. Cl.
*G06F 21/62* (2013.01)
*H04L 9/40* (2022.01)

(52) U.S. Cl.
CPC ...... *G06F 21/6245* (2013.01); *H04L 63/0428* (2013.01)

(58) Field of Classification Search
CPC .............. G06F 21/6245; H04L 63/0428
USPC ......................................................... 726/22
See application file for complete search history.

(56) References Cited

U.S. PATENT DOCUMENTS

| | | | | |
|---|---|---|---|---|
| 4,808,802 A * | 2/1989 | Kano | ............... | G06Q 20/341 235/380 |
| 8,812,875 B1 * | 8/2014 | Melvin | ............... | G06F 21/6245 713/193 |
| 10,417,444 B2 * | 9/2019 | Wakita | ............... | H04L 67/02 |
| 2008/0154780 A1 * | 6/2008 | Soukup | ............... | G06F 21/10 705/54 |
| 2009/0150970 A1 * | 6/2009 | Hinds | ............... | G06F 21/88 726/1 |
| 2014/0007191 A1 * | 1/2014 | Hu | ............... | G06F 21/6245 726/3 |
| 2014/0273880 A1 * | 9/2014 | Sima | ............... | H04W 12/082 455/68 |
| 2015/0347784 A1 * | 12/2015 | Keen | ............... | H04L 67/12 726/28 |
| 2019/0057226 A1 * | 2/2019 | Arbutina | ............... | G06F 21/64 |
| 2021/0383370 A1 * | 12/2021 | Tippets | ............... | G06Q 20/383 |
| 2022/0329436 A1 * | 10/2022 | Gaur | ............... | H04L 9/50 |
| 2023/0006976 A1 * | 1/2023 | Jakobsson | ............... | H04L 63/10 |

* cited by examiner

*Primary Examiner* — Dant B Shaifer Harriman
(74) *Attorney, Agent, or Firm* — Fletcher Yoder, P.C.

(57) ABSTRACT

This disclosure is directed to systems and methods for system for protecting privacy of data. The systems and methods include utilizing one or more processors to perform actions. The actions include receiving a request for an individual to provide data to an entity. The actions also include identifying the data of the individual to share with the entity. The actions further include collecting the data in a protected digital identification data packet. The actions even further include sending the protected digital identification data packet to an identified and secure source of the entity. The actions still further include receiving and confirming the data in the protected digital identification data packet at the source of the entity. The actions yet further include automatically causing alteration (e.g., deletion) of the data based on confirmation of the data to prevent further access to the data.

1 Claim, 7 Drawing Sheets

SYSTEM AND METHOD FOR PROTECTING PRIVACY OF DATA

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To utilize many services or products, individuals must first prove their identity by providing corresponding information (e.g., validation data). This information often includes sensitive data that individuals want to protect. More often than not, companies keep this data in their systems. However, bad actors continue to increase efforts to steal this data. As data breaches increase in volume and sophistication, there is a need to protect this data. Decentralized data allows individuals to have more control over their data (e.g., how it is shared, who it is share with, etc.). However, there is still a need for the ability to control the data after it has been shared with an entity and it has served its intended purpose.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system for protecting privacy of data is provided. The system includes one or more hardware processors. The system also includes a non-transitory memory, the non-transitory memory storing instructions that, when executed by the one or more hardware processors, causes the one or more hardware processors to perform actions. The actions include receiving a request for an individual to provide data to an entity. The actions also include identifying the data of the individual to share with the entity. The actions further include collecting the data in a protected digital identification data packet. The actions even further include sending the protected digital identification data packet to an identified and secure source of the entity. The actions still further include receiving and confirming the data in the protected digital identification data packet at the source of the entity. The actions yet further include automatically causing alteration of the data based on confirmation of the data to prevent further access to the data.

In certain embodiments, a computer-implemented method for protecting privacy of data is provided. The method includes receiving, at one or more processors, a request for an individual to provide data to an entity. The method also includes, via the one or more processors, identifying the data of the individual to share with the entity. The method further includes, via the one or more processors, collecting the data in a protected digital identification data packet. The method even further includes, via the one or more processors, sending the protected digital identification data packet to an identified and secure source of the entity. The method still further includes, via the one or more processors, receiving and confirming the data in the protected digital identification data packet at the source of the entity. The method yet further includes, via the one or more processors, automatically causing deletion of the data based on confirmation of the data to prevent further access to the data.

In certain embodiments, a non-transitory computer-readable medium includes processor-executable code that when executed by a processor, causes the processor to perform actions. The actions include receiving a request for an individual to provide data to an entity. The actions also include identifying the data of the individual to share with the entity. The actions further include collecting the data in a protected digital identification data packet. The actions even further include sending the protected digital identification data packet to an identified and secure source of the entity. The actions still further include receiving and confirming the data in the protected digital identification data packet at the source of the entity. The actions yet further include automatically causing deletion of the data based on confirmation of the data to prevent further access to the data. The actions further include sending a confirmation to the individual that the data has been received and confirmed by the entity and that the data has been deleted to prevent further access.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
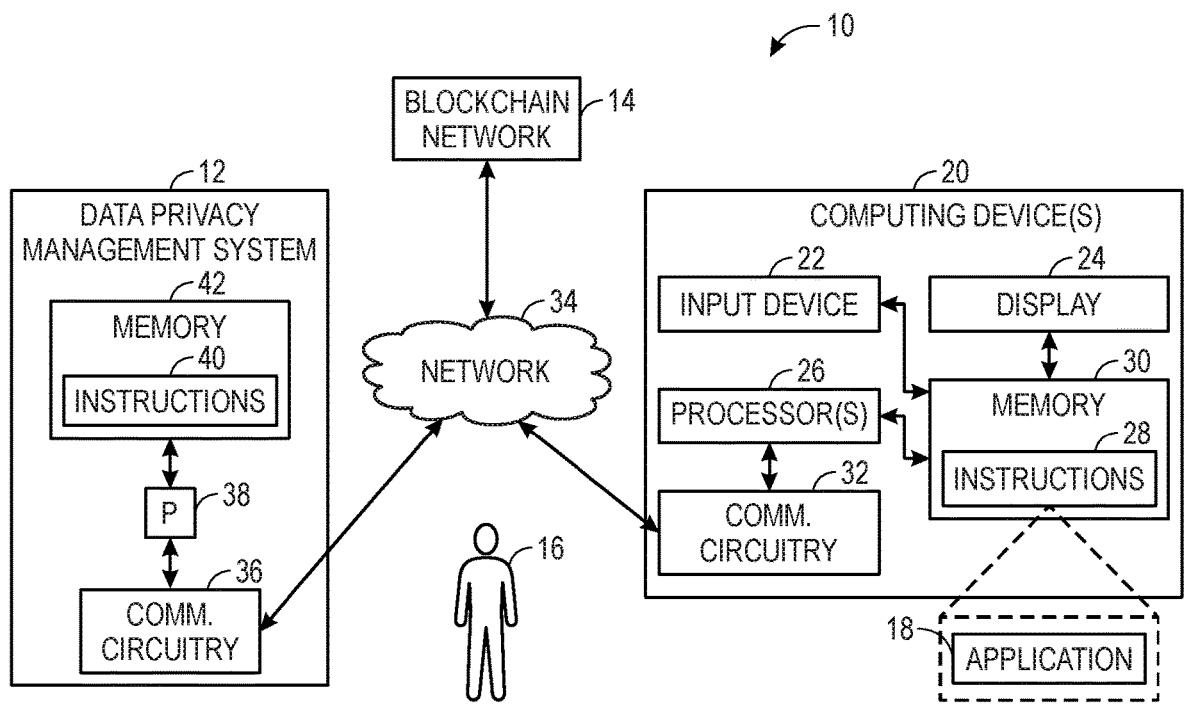
FIG. 1 is a schematic diagram of a system for protecting privacy of data, in accordance with aspects of the present disclosure.

The present disclosure relates generally to systems and methods for protecting privacy of data (e.g., via alteration of data).

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As may be appreciated, implementations of the present disclosure may be embodied as a system, method, device, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer-readable program code embodied thereon.

As used herein, the term "application" refers to one or more computing modules, programs, processes, workloads, threads, and/or computing instructions executed by a computing system. Example embodiments of an application include software modules, software objects, software instances, and/or other types of executable code.

As used herein, the terms "automatic" and "automatically" refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions. In addition, as used herein, the term "autonomous" and "autonomously" refers to functions that are performed by computing devices or systems solely based on the functionality programmed into the computing devices or systems, for example, without requiring human intervention and/or input from external sources, such as external data sources. In addition, as used herein, the term "bot" refers to an autonomous program configured to autonomously run on a computer network to provide certain functionality and/or data for human users without the need for receiving active supervision from the human users. In other words, a bot may be capable of finding and/or learning certain functionality and/or data even when human users of the bot are not interacting with the bot and/or computer network on which the bot is running.

The present disclosure relates generally to systems and methods for protecting privacy of data (e.g., identifying data provided by an individual to an entity). Identifying data may include a social security number, a driving license number, a digital copy of a passport, a driving license card, a biometric residence card, a national identity car, a travel document, and a birth or adoption certificate or certificate of registry of birth, and/or other identification data (e.g., digital identity data that can be traced back to the real individual such as an online bank account, social media, gamer account, etc.). For example, in certain embodiments, an entity (e.g., business, service provider, etc.) requests an individual (e.g., for the utilization of a product or service) to provide identifying data (and/or financial data). Upon receiving a request for this data, a data privacy management system identifies the data of the individual to share with the entity. In certain embodiments, the data may be decentralized data located on a blockchain.

The data privacy management system also collects or gathers the data in a protected digital identification data packet. In certain embodiments, the collecting or gathering of the data in the digital protected identification data packet includes generating a data non-fungible token (NFT). The data NFT represents a copyright (or exclusive license against copyright) (i.e., base intellectual property (IP)) for a data asset on the blockchain. When a user publishes a dataset in a decentralized network for exchanging data (e.g., between data providers and data consumers in block-chained market place) a new NFT is created as part of the process. This data NFT is proof of the individual's claim to the base IP. Assuming a valid claim, the individual is entitled to revenue from that asset. The data NFT smart contract holds metadata about the data asset, stores roles (e.g., who can mint data tokens, who controls fees, etc.), and an open-ended key-value store to enable custom fields.

The data privacy management system further sends the protected digital identification data packet to an identified and secure source of the entity. The entity receives and confirms the data in the protected digital identification data packet. Confirmation of the data automatically causes alteration of the data based on confirmation of the data to prevent further access to the data. In certain embodiments, the data is deleted. In certain embodiments, an encryption key associated with the protected digital identification data packet is altered. A confirmation is sent, via the data privacy management system to the individual confirming receipt and confirmation of the data by the entity. In certain embodiments, automatic alteration of the data based on confirmation of the data occurs after a number of uses of the data by the entity or a certain amount of time has expired after confirmation of the data by the entity. In certain embodiments, alteration of the data automatically occurs to prevent access to the data upon reaching a set amount of time after the protected digital identification data packet was sent to the entity. In certain embodiments, automatic alteration of the data occurs upon an unauthorized entity or unauthorized individual attempting to access the data and a notification is provided, via the data privacy management system, to the individual of this unauthorized attempt to access the data.

The data privacy management system and utilization of alteration data allows individuals to share needed information without concern it will be stored and potentially stolen. In addition, the data privacy management system provides privacy in transit (i.e., differential privacy). The disclosed embodiments, improves computer operation by providing a more secure mechanism for the exchange of important and sensitive information.

FIG. 1 is a schematic diagram of a system 10 protecting privacy of data. An entity (e.g., business, service provider, etc.) may requests an individual (e.g., for the utilization of a product or service) to provide identifying data (and/or financial data). Identifying data may include a social security number, a driving license number, a digital copy of a passport, a driving license card, a biometric residence card, a national identity car, a travel document, and a birth or adoption certificate or certificate of registry of birth, and/or other identification data (e.g., digital identity data that can be traced back to the real individual such as an online bank account, social media, gamer account, etc.). Financial data may include a bank account number, a routing number, credit card information, or other financial information. For example, in certain embodiments, an entity (e.g., business, service provider, etc.) requests an individual (e.g., for the utilization of a product or service) to provide identifying data (and/or financial data).

The system 10 includes a data privacy management system 12 (e.g., physical computing system and/or a cloud-computing system) configured to manage the privacy of data (identifying data and/or financial data) provided by an individual to an entity. The data privacy management system 12 is configured to receive a request for data from an entity. The data privacy management system 12 is also configured to upon receiving the request for this data to identify the data of the individual to share with the entity. In certain embodiments, the data may be decentralized data located on a blockchain network 14 (e.g., distributed, decentralized blockchain network). The data privacy management system is also configured to collect or gather the data in a protected digital identification data packet. In certain embodiments, the collecting or gathering of the data in the digital protected identification data packet includes generating a data NFT. The data NFT represents a copyright (or exclusive license against copyright) (i.e., base intellectual property (IP)) for a data asset on the blockchain network 14. When a user publishes a dataset in a decentralized network for exchanging data (e.g., between data providers and data consumers in block-chained market place) a new NFT is created as part of the process. This data NFT is proof of the individual's claim to the base IP. Assuming a valid claim, the individual is entitled to revenue from that asset. The data NFT smart contract holds metadata about the data asset, stores roles (e.g., who can mint data tokens, who controls fees, etc.), and an open-ended key-value store to enable custom fields. The data within the digital protected identification data packet is encrypted and the digital protected identification data packet includes an encryption key. The data privacy management system 12 is configured to provide the entity the encryption key to decrypt the data within the digital identification data packet (e.g., upon the entity confirming its identity).

In certain embodiments, the data privacy management system 12 is configured to request from the individual providing information relevant to (e.g., parameters for) the digital identification data packet. This information (or parameters) may be a number of uses of the data before causing alteration of the data or a set amount of time for confirming the data after the protected digital identification data packet was sent to the entity before causing alteration of the data.

The data privacy management system 12 is further configured to send the protected digital identification data packet to an identified and secure source of the entity. The protected digital identification data packet may be sent automatically or only after receiving requested information (or parameters) from the individual relevant to the protected digital identification data packet. The entity receives and confirms the data in the protected digital identification data packet (which is monitored by the data privacy management system 12).

Confirmation of the data automatically causes alteration of the data based on confirmation of the data to prevent further access to the data. In certain embodiments, the data is deleted. In certain embodiments, alteration (e.g., changing) of the encryption key associated with the protected digital identification data packet occurs. A confirmation is sent, via the data privacy management system 12, to the individual confirming receipt and confirmation of the data by the entity. In certain embodiments, automatic alteration of the data based on confirmation of the data occurs after a number of uses of the data by the entity or a certain amount of time has expired after confirmation of the data by the entity. In certain embodiments, automatic alteration of the data occurs to prevent access to the data upon reaching a set amount of time after the protected digital identification data packet was sent to the entity. In certain embodiments, automatic alteration of the data occurs upon an unauthorized entity or unauthorized individual attempting to access the data and a notification is provided, via the data privacy management system, to the individual of this unauthorized attempt to access the data.

As depicted in FIG. 1, users 16 (e.g., individuals) interact (e.g., directly or indirectly) with the data privacy management system 12 via an application 18 executable via computing devices 20 used by the users 16. In certain embodiments, entities requesting information from the users 16 may also interact with the data privacy management system 12 via the application. In certain embodiments, the computing devices 20 may include any computing devices 20 configured to execute the applications 18 including, but not limited to, smart phones, computing tablets, personal computers (PCs), laptop computers, wearable computing devices, and so forth. In certain embodiments, each computing device 20 may be registered with the data privacy management system 12 by, for example, registering the computing device 20 (e.g., using a universally unique identifier (UUID), media access control (MAC) address, and so forth) with a user account (e.g., using a unique user identification number) associated with a particular user 16. Therefore, interaction with the application 18 by a particular user 16 via a particular computing device 20 may be automatically associated with that user 16.

The users 16 manipulate one or more input devices 22 (e.g., keyboards, mice, buttons, touch screens, and so forth) of the computing devices 20 to enable the users 16 to interact with the application 18, the data privacy management system 12, or platforms associated with the blockchain network 14, which may be displayed on one or more displays 24 (e.g., light emitting diode (LED) displays, organic LED (OLED) displays, and so forth) of the computing devices 20. In certain embodiments, the users 16 may login to particular computing devices 20 such that user identifiers (e.g., user identification numbers) may be tracked to associate detected activity with the particular user 16.

As illustrated in FIG. 1, in certain embodiments, the computing devices 20 may also include processing circuitry such as one or more processors 26 configured to execute instructions 28 stored in memory media 30 of the respective computing device 20, wherein the instructions 28, when executed by the one or more processors 26, enable the respective computing device 20 to interact with the application 18, as well as other web pages, applications, and so forth.

In certain embodiments, the one or more processors 26 of the computing devices 20 may be any suitable type of computer processors or microprocessors capable of executing computer-executable code. In certain embodiments, the memory media 30 of the computing devices 20 may be any suitable articles of manufacture that can serve as media to store processor-executable code, data, or the like. These articles of manufacture may represent computer-readable media (e.g., any suitable form of memory or storage) that may store processor-executable code (e.g., the instructions 28) executed by the one or more processors 26 to perform the presently disclosed techniques. In certain embodiments, the memory media 30 of the computing devices 20 may represent tangible, non-transitory computer-readable media (e.g., any suitable form of memory or storage) that may store the processor-executable code used by the one or more processors 26 to perform various techniques described herein. It should be noted that non-transitory merely indicates that the media is tangible and not a signal. It should be noted that the components described above with regard to the computing devices 20 are exemplary components, and the computing devices 20 may include additional or fewer components in certain embodiments.

In addition, in certain embodiments, the computing devices 20 may also include communication circuitry 32 configured to facilitate communication between the respective computing device 20 and the data privacy management system 12 described herein. For example, in certain embodiments, the computing devices 20 may transmit data (e.g., identifying data, financial data, data related to the protected digital identification data packet) to the data privacy management system 12 to facilitate the privacy of data provided to an entity. In certain embodiments, the communication circuitry 32 may facilitate communications using Wi-Fi, near field communication, Bluetooth, Zigbee, radio frequency identification (RFID) tags and/or readers, an embedded wireless module, and/or another suitable wired or wireless communication network 34.

In certain embodiments, the data privacy management system 12 may include communication circuitry 36 configured to facilitate communication between the data privacy management system 12 and the computing devices 20 and the blockchain network 14. For example, the data privacy management system 12 may receive data or inquiries (e.g., from the individual or the entity) from one or more computing devices 20 and/or the blockchain network 14 via the communication circuitry 36. In certain embodiments, the communication circuitry 36 may facilitate communications using Wi-Fi, near field communication, Bluetooth, Zigbee, radio frequency identification (RFID) tags and/or readers, an embedded wireless module, and/or another suitable wired or wireless communication network 34.

As illustrated in FIG. 1, in certain embodiments, the data privacy management system 12 may include other processing circuitry such as one or more processors 38 configured to execute instructions 40 stored in memory media 42 of the data privacy management system 12, wherein the instructions 40, when executed by the one or more processors 38, enable the data privacy management system 12 to perform the functions described in greater detail herein. In certain embodiments, the one or more processors 38 of the data privacy management system 12 may be any suitable type of computer processors or microprocessors capable of executing computer-executable code. In certain embodiments, the memory media 42 of the data privacy management system 12 may be any suitable articles of manufacture that can serve as media to store processor-executable code, data, or the like. These articles of manufacture may represent computer-readable media (e.g., any suitable form of memory or storage) that may store processor-executable code (e.g., the instructions 40) executed by the one or more processors 38 to perform the presently disclosed techniques.

In certain embodiments, the memory media 42 of the data privacy management system 12 may also be used to store data related to maintaining the privacy of data. In certain embodiments, the memory media 42 of the data privacy management system 12 may represent tangible, non-transitory computer-readable media (e.g., any suitable form of memory or storage) that may store the processor-executable code used by the one or more processors 38 to perform various techniques described herein. It should be noted that non-transitory merely indicates that the media is tangible and not a signal. It should be noted that the components described above with regard to the data privacy management system 12 are exemplary components, and the data privacy management system 12 may include additional or fewer components in certain embodiments.

In addition, in certain embodiments, the data privacy management system 12 may function as an execution layer (e.g., as plug-in software) that any and all software applications interacting with the blockchain network 14 may utilize to enable the data privacy management system 12 to ensure differential privacy of data exchanged between an individual and an entity, as described in greater detail herein. Indeed, in certain embodiments, the data privacy management system 12 may be deployed as a cloud-based data privacy management network to facilitate decentralized management of the data privacy described herein.

Figure 2:
FIG. 2 is a schematic diagram of an embodiment of an arrangement for providing data privacy management services, in accordance with aspects of the present disclosure.

FIG. 2 is a schematic diagram of an embodiment of an arrangement for providing data privacy management services. As depicted, a data privacy management service 44 (e.g., utilizing the data privacy management system 12 in FIG. 1) ensures the privacy of data (e.g., identifying data and/or financial data) provided by an individual 46 to an entity 48 (e.g., business, service provider, etc.). The data privacy management service 44 facilitates differential privacy for the data provided by the individual 46 to the entity 48. In certain embodiments, the data privacy management service 44 is provided by the entity 48. In certain embodiments, the data privacy management system is provided by a third party (e.g., independent of the individual 46 and the entity 48) at the request of the individual 46 and/or entity 48.

Figure 3:
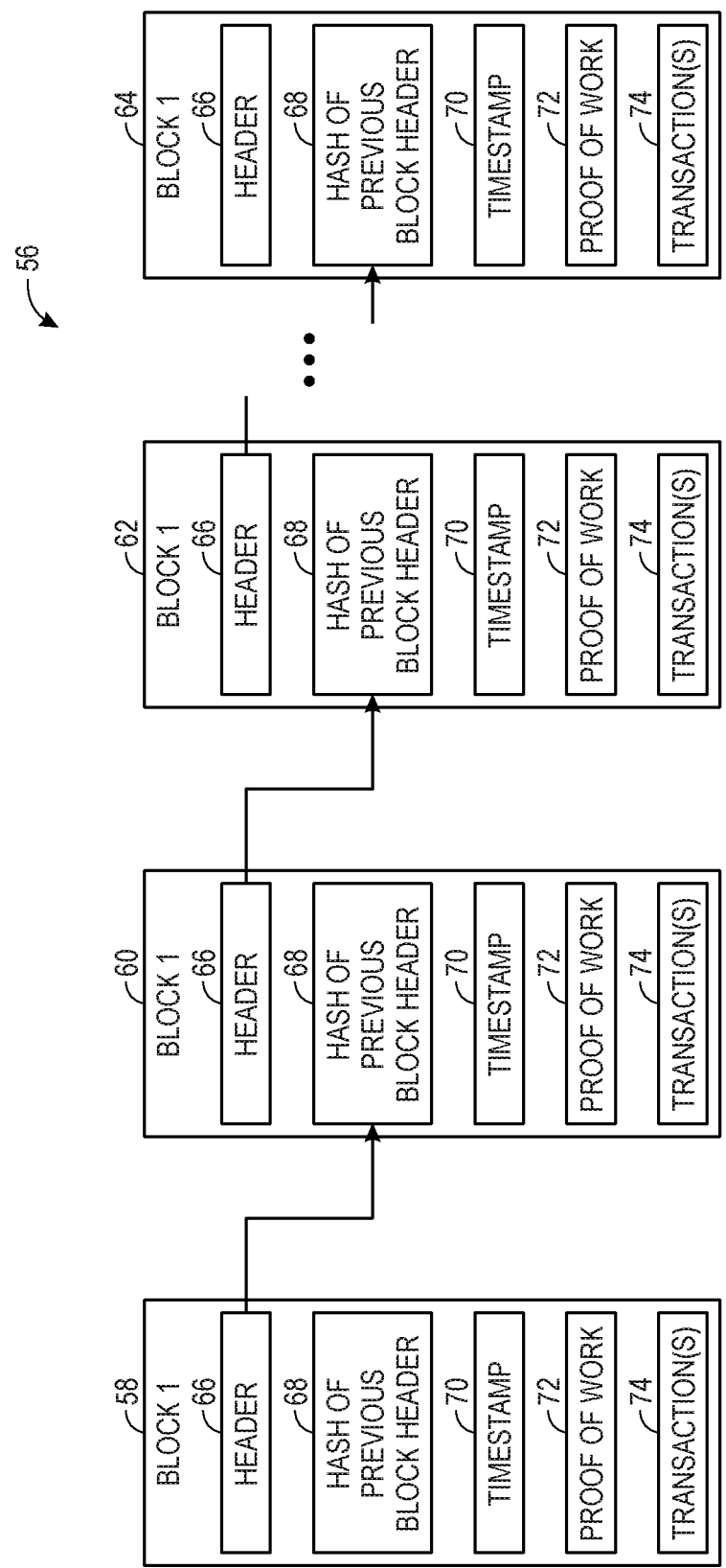
FIG. 3 illustrates a block diagram of a blockchain of a blockchain network of FIG. 1, in accordance with aspects of the present disclosure.

FIG. 3 illustrates a block diagram of a blockchain 56 of the blockchain network 14 of FIG. 1 which includes the data (e.g., data NFTs) and/or smart contracts related to the management of the privacy of the data. In the illustrated embodiment, the blockchain 56 is illustrated as having multiple blocks 58, 60, 62, and 64. The block 58 (first block in the blockchain 56) may have been created and allocated as a special starting block. The block 58 may include a unique header 66 uniquely identifying the block 58 from other blocks in the blockchain 56. Because the block 58 is the first block in the blockchain 56, a hash of a previous block header 66 may be set to zero. A timestamp 70 may include the date of creation for the block 58, and a proof of work section 72 may include certain "work" that proves that a "miner" has performed work suitable for the creation of the block 58 and/or to verify transactions in the blockchain 56. The work section 72 may vary based on a protocol used to create the blockchain 56. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 56, and so on, down the tree. In other words, there is no way to create a fake value that would hash to an expected Merkle tree value (e.g., value stored in work section 72 of the block 58), thus creating a single value that proves the integrity of all of the transactions under it. Transactions, such as transactions related to the smart contract/assets described herein, may be stored in a transactions section 74. Data related to the particular transaction may also be stored in section 74 (or in another section).

When a new block is created, the block will receive a new header 66 uniquely identifying the new block. As described in greater detail herein, a peer-to-peer network may include multiple "miners" that add blocks to the blockchain 56 based on the blockchain protocol. In general, multiple miners validate transactions 74 that are to be added to a block, and compete (e.g., perform computing work, as introduced above) to have their respective block added to the blockchain 56. Validation of transactions includes verifying digital signatures associated with respective transactions 74. For a block to be added to the blockchain 56, a miner must demonstrate a proof of work before their proposed block of transactions is accepted by the peer-to-peer network, and before the block is added to the blockchain 56. In certain embodiments, a blockchain protocol includes a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 68) in the blockchain 56, details of the transaction(s) 74 that are to be included in the to-be-created block, and a "nonce" value (e.g., a random number used only once).

Multiple nodes may compete to hash a set of transactions, and to provide the next block that is to be added to the blockchain 56. In certain embodiments, the blockchain protocol may provide a threshold hash to qualify a block to be added to the blockchain 56. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 56. Each miner provides the reference to the previous (most recent) block in the blockchain 56, details of the transaction(s) 74 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 56. Consequently, the respective miner's block is broadcast across the peer-to-peer network. At this point, all other miners cease work (because one miner was already successful), and all copies of the blockchain 56 are updated across the peer-to-peer network to append the block to the blockchain 56. Each miner may produce hundreds of thousands (or more) of hash values, before any one miner provides a qualifying hash value (e.g., at least the first four characters of the hash value are each zero).

It is to be noted that any computing device 20 may be miners. Accordingly, for example, as new data is created, new blocks may be added to the blockchain 56, including blocks 58, 60, 62, and 64. Indeed, the blockchain 56 may continue to grow, storing new data as it becomes available. Because of the distributed nature of the peer-to-peer network created via the blockchain network 14, each node may include copies of the blockchain 56 and share copies of the blockchain 56 as new peers enter the peer-to-peer network. Each copy of the blockchain 56 may include verified information for all or substantially all of the data tracked by the blockchain network 14. The information is secure, immutable, and more efficiently tracked as new data gets added via the blockchain network 14.

Figure 4:
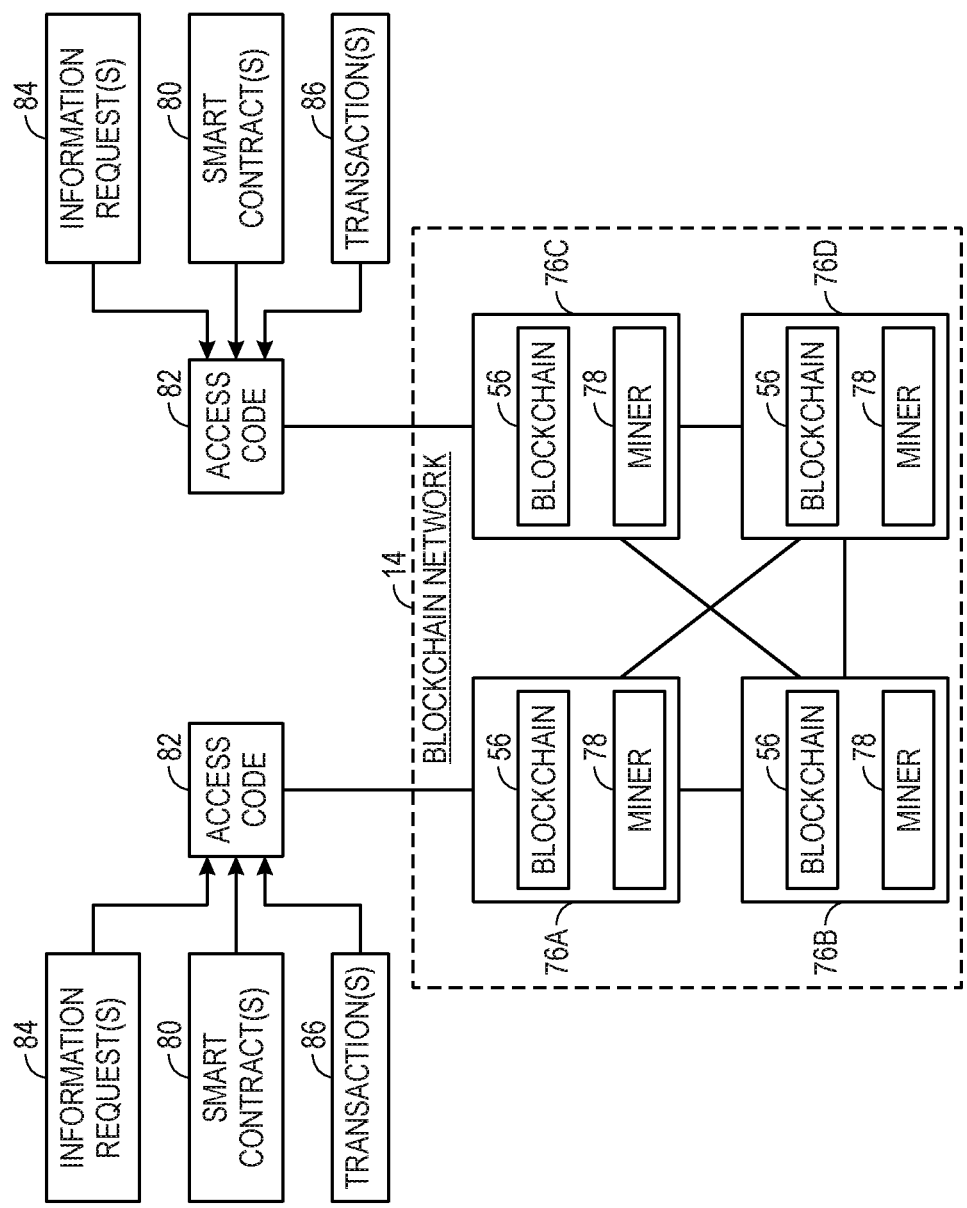
FIG. 4 illustrates a block diagram of a portion of the system of FIG. 1, which may be used to manage privacy of data distributed across a distributed ledger (e.g., blockchain network), in accordance with aspects of the present disclosure.

FIG. 4 illustrates a portion of the system 10 of FIG. 1, which may be used to manage privacy of data distributed across a distributed ledger (e.g., blockchain network) 14, in accordance with embodiments described herein. As described herein, the blockchain network 14 may be formed by several blockchain nodes, such as blockchain nodes 76A, 76B, 76C, and 76D, which may be implemented by a dedicated server or computer device, or may be implemented as a virtual machine in a shared computer system. Each blockchain node 76A-D may have in its memory a replicate of the blockchain 56. Each blockchain node 76A-D may also have a miner 78, an application that may verify the integrity of the blockchain 56, and may also perform operations and/or transactions using smart contracts 80 associated with the blockchain 56. As described herein, the blockchain

56 is a replicated data structure that may have its consistency and integrity preserved by a consensus mechanism performed by the miners 78.

Users may interact with the blockchain network 14 via an access node 82. For example, users may request, through the access node 82, the recordation and/or processing of data (e.g., using a smart contract 80), such as an information request 84 (e.g., a request for the state of a smart contract 80), or a transaction request 86 (e.g., a request for a change in a state of the smart contract 80) to the blockchain 56. The smart contracts 80, information requests 84, and/or transaction requests 86 allow users to record certain data relating to the management of data privacy via smart contracts/assets described herein. Each access node 82 may be implemented by a computer terminal coupled to the blockchain network 14.

A miner 78 from any of the blockchain nodes 76A, 76B, 76C, and 76D may create an update to the blockchain 56. In certain embodiments, the smart contract(s) 80 may be a data structure that may include states (e.g., internal states) and transaction instructions relating to the data stored in the blockchain 56. The transactions, or functions, may include instructions that modify the states of the smart contracts 80 and/or interact with other smart contracts 80 by performing further transactions. Examples of smart contracts 80 described herein include smart contracts 80 related to storing data relating to management of privacy of data described herein. Following insertion of a smart contract 80, the blockchain node 76 may propagate its update of the blockchain 56, and the other blockchain nodes 76 may accept the update using a consensus mechanism (e.g., proof of work, proof of stake, and so forth). For example, if blockchain node 76A generated a blockchain segment that incorporates some smart contract 80 to the blockchain 56, blockchain node 76A may propagate the updated blockchain 56 to blockchain nodes 76B, 76C, and 76D, which may validate and accept the updated blockchain 56.

Similarly, a transaction request 86 may be received by any miner 78 of the blockchain nodes 76A, 76B, 76C, and 76D via an access node 82. The transaction request 86 may perform operations that cause a change in the state of a smart contract 80 recorded in the blockchain 56. After performing the desired operations, and changing the state of the smart contract 80, in accordance with the transaction request 86, the miner 78 may update the blockchain 56 to record the updated state of the smart contract 80. The updated state of the smart contract 80 may be propagated to the blockchain nodes 76A-D, verified, and persisted using consensus mechanisms. An information request 84, similar to a transaction request 86, may be received by a miner 78, and may perform operations associated with a smart contract 80. However, in contrast with the transaction request 86, the information request 84 does not lead to changes in the state of the smart contract 80 and, thus, updates to the blockchain 56 that result from a successful information request 84 are not performed.

In certain embodiments, performance of the operations by the miners 78 of the blockchain nodes 76 may be incentivized and/or regulated by exchange of tokens (e.g., currencies) of the blockchain 56. For example, in public blockchains, updates to the blockchain 56 by a blockchain node 76A-D may be rewarded with a blockchain token. Moreover, performance of a transaction request 86 or an information request 84 may be rewarded with a blockchain token. For example, in certain embodiments, in the Ethereum public blockchain, updates to the blockchain from recordation of smart contracts 80 and information requests 84 may be rewarded with Ether tokens, and performance of transaction requests 86 and information requests 84 may be incentivized by offers of Ethers in the form of a secondary token called "gas". In certain private blockchain embodiments, tokens may be used to implement prioritization mechanisms for the operations and/or to prevent large or faulty operations from blocking the blockchain 56 with arbitrarily long operation times.

Figure 5:
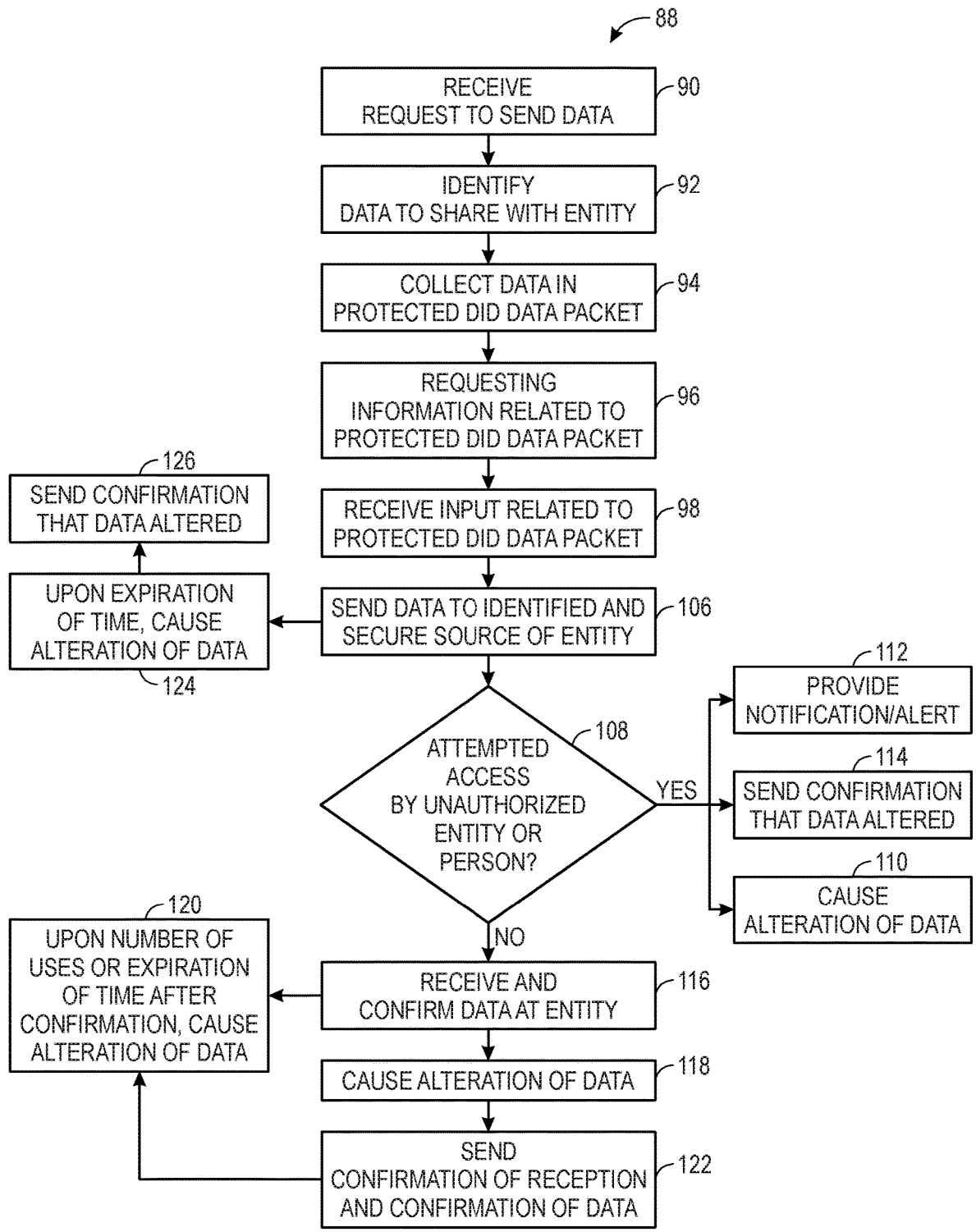
FIG. 5 is a flowchart of a method for managing and/or protecting privacy of data, in accordance with aspects of the present disclosure.

FIG. 5 is a flowchart of a method 88 for managing and/or protecting privacy of data. One or more steps of the method 88 may be carried out by one or more components of the data privacy management system 12 illustrated in FIG. 1. One or more steps of the method 88 may be performed simultaneously or in a different order from the order depicted in FIG. 5.

The method 88 includes receiving a request (e.g., from an entity such as a business or service provider) for an individual to provide data (e.g., identifying data and/or financial data) to the entity (e.g., for the purposes of receiving or utilizing a service or a product) (block 90). The method 88 also includes identifying the data of the individual to share with the entity (block 92). As noted above, the data may be decentralized data located across a blockchain network. Identifying the data may involve interacting with the blockchain network.

The method 88 further includes collecting or gathering the data (e.g., from the blockchain network) in a protected digital identification data packet (block 94). In certain embodiments, the collecting or gathering of the data in the digital protected identification data packet includes generating a data NFT. The data NFT smart contract holds metadata about the data asset, stores roles (e.g., who can mint data tokens, who controls fees, etc.), and an open-ended key-value store to enable custom fields. The data within the digital protected identification data packet is encrypted and the digital protected identification data packet includes an encryption key.

Figure 6:
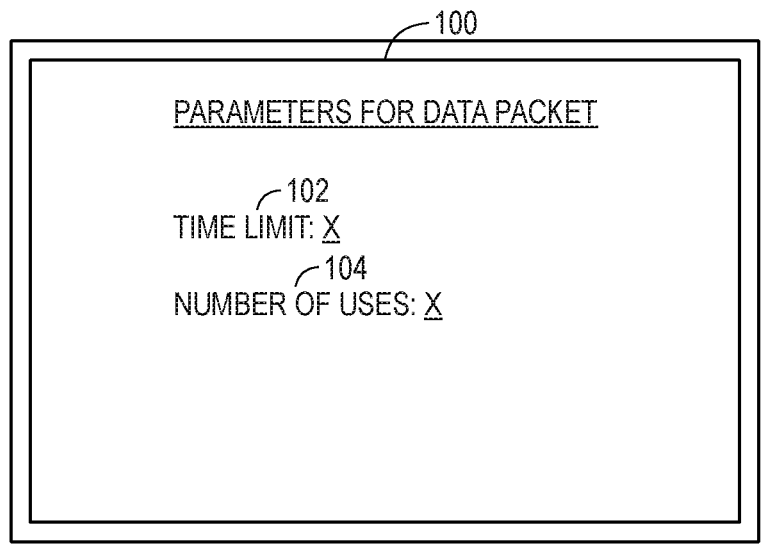
FIG. 6 is a schematic diagram of a user interface presented to a user for providing information related to a protected digital identification data packet, in accordance with aspects of the present disclosure.

In certain embodiments, the method 88 includes requesting information (e.g., from an individual from a user's computing device) related to the protected digital identification data packet (block 96). In certain embodiments, the information may be provided in response to a request from the data privacy management system 12. In certain embodiments, the information may relate to parameters for the protected digital identification data packet. In certain embodiments, the parameters include a number of uses of the data before causing alteration of the data or a set amount of time for confirming the data after the protected digital identification data packet was sent to the entity before causing alteration of the data. The method 88 also includes receiving an input (i.e., the requested information) from the individual (e.g., from the user's computing device) related to the protected digital identification data packet (block 98). FIG. 6 is a schematic diagram of a user interface 100 presented to a user or individual (e.g., on a display of the user's device) for providing information related to a protected digital identification data packet. In certain embodiments, the user interface 100 includes a field 102 for entering a time limit for the data to be confirmed before alteration of the data to prevent access to the data. In certain embodiments, the user interface 100 includes a field 104 for a number of uses of the data by entity before alteration of the data occurs to prevent access to the data. The inputs of the information for the fields 102, 104 may be provided via an input device on the user's device.

Returning to FIG. 5, the method 88 includes sending the protected digital identification data packet (including the data) to an identified and secure source (e.g., server or computing device) of the entity (block 106). In addition, the data privacy management system 12 may also provide the entity with the encryption key to decrypt the data within the digital identification data packet (e.g., upon the entity confirming its identity).

The method 88 also includes monitoring for an unauthorized attempt to access the data within the protected digital identification data packet (block 108). If an unauthorized entity or unauthorized person attempted to access the data, the method 88 includes automatically causing alteration of the data to prevent further access to the data in response to the unauthorized attempt (block 110). In certain embodiments, the data is deleted. In certain embodiments, alteration of the encryption key occurs. In certain embodiments, a data NFT of the protected digital identification data packet calls a method or function internally for the alteration. In response to the unauthorized attempt, the method 88 also includes providing a notification or alert (e.g., on a user device of the individual who provided the data) of the unauthorized attempt to access the data (block 112). Also, in response to the unauthorized attempt, the method 88 includes sending a confirmation to the individual (e.g., on the user device) that the data was altered (block 114).

If no unauthorized entity or unauthorized person attempted to access the data, the method 88 includes receiving and confirming the data within the protected digital identification data packet at the entity (block 116). In certain embodiments, the method 88 includes automatically causing alteration of the data based on confirmation of the data to prevent further access to the data (block 118). In certain embodiments, the method 88 includes automatically causing alteration of the data upon a number of uses of the data by the entity or expiration of a set amount of time after confirmation (or first use) of the data by the entity (block 120). In certain embodiments, alteration of the data includes deleting the data. In certain embodiments, alteration of the encryption key occurs. In certain embodiments, a data NFT of the protected digital identification data packet calls a method or function internally for the alteration. Once alteration of the data occurs, the method 88 includes sending a confirmation to the individual that the data has been received and confirmed by the entity and that the data has been altered to prevent further access (block 122).

In certain embodiments, the method 88 includes automatically causing alteration of the data to prevent access to the data upon reaching a set amount of time after the protected digital identification data packet was sent to the entity (block 124). Once alteration of the data occurs, the method 88 includes sending a confirmation that the data has not been received and/or confirmed within the set amount of time and that the data has been altered (block 126).

Figure 7:
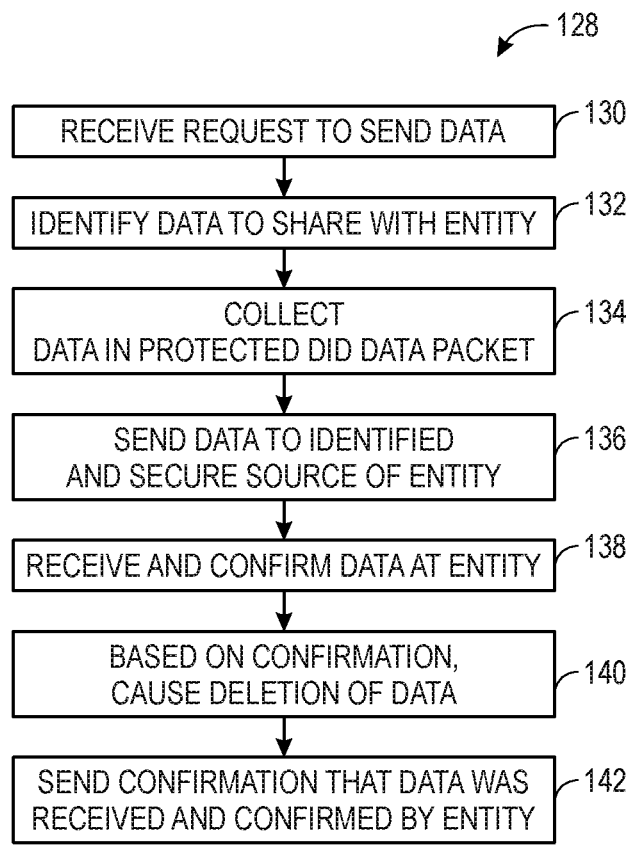
FIG. 7 is a flowchart of a method for managing and/or protecting privacy of data (e.g., with data being deleted), in accordance with aspects of the present disclosure.

FIG. 7 is a flowchart of a method 128 for managing and/or protecting privacy of data (e.g., with deletion of the data). One or more steps of the method 128 may be carried out by one or more components of the data privacy management system 12 illustrated in FIG. 1. One or more steps of the method 128 may be performed simultaneously or in a different order from the order depicted in FIG. 7.

The method 128 includes receiving a request (e.g., from an entity such as a business or service provider) for an individual to provide data (e.g., identifying data and/or financial data) to the entity (e.g., for the purposes of receiving or utilizing a service or a product) (block 130). The method 128 also includes identifying the data of the individual to share with the entity (block 132). As noted above, the data may be decentralized data located across a blockchain network. Identifying the data may involve interacting with the blockchain network.

The method 128 further includes collecting or gathering the data (e.g., from the blockchain network) in a protected digital identification data packet (block 134). In certain embodiments, the collecting or gathering of the data in the digital protected identification data packet includes generating a data NFT. The data within the digital protected identification data packet is encrypted and the digital protected identification data packet includes an encryption key.

The method 128 even further includes sending the protected digital identification data packet (including the data) to an identified and secure source (e.g., server or computing device) of the entity (block 136). In addition, the data privacy management system 12 may also provide the entity the encryption key to decrypt the data within the digital identification data packet (e.g., upon the entity confirming its identity).

The method 128 yet further includes receiving and confirming the data within the protected digital identification data packet at the entity (block 138). The method 128 includes automatically causing deletion of the data based on confirmation of the data to prevent further access to the data (block 140). Once the data is deleted, the method 128 includes sending a confirmation to the individual that the data has been received and confirmed by the entity and that the data has been deleted to prevent further access (block 142).

Figure 8:
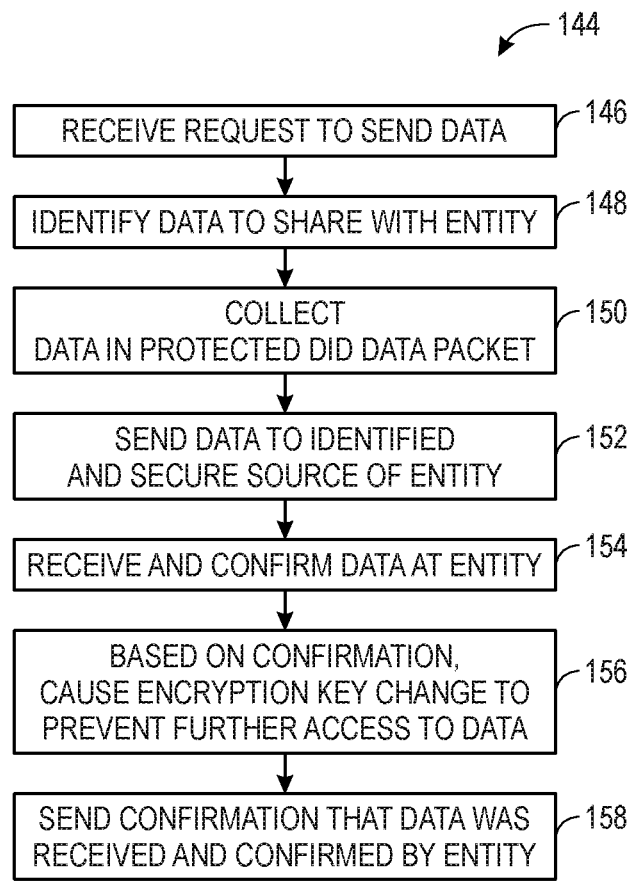
FIG. 8 is a flowchart of a method for managing and/or protecting privacy of data (e.g., utilizing encryption key changes), in accordance with aspects of the present disclosure.

FIG. 8 is a flowchart of a method 144 for managing and/or protecting privacy of data (e.g., utilizing encryption key changes). One or more steps of the method 144 may be carried out by one or more components of the data privacy management system 12 illustrated in FIG. 1. One or more steps of the method 144 may be performed simultaneously or in a different order from the order depicted in FIG. 8.

The method 144 includes receiving a request (e.g., from an entity such as a business or service provider) for an individual to provide data (e.g., identifying data and/or financial data) to the entity (e.g., for the purposes of receiving or utilizing a service or a product) (block 146). The method 144 also includes identifying the data of the individual to share with the entity (block 148). As noted above, the data may be decentralized data located across a blockchain network. Identifying the data may involve interacting with the blockchain network.

The method 144 further includes collecting or gathering the data (e.g., from the blockchain network) in a protected digital identification data packet (block 150). In certain embodiments, the collecting or gathering of the data in the digital protected identification data packet includes generating a data NFT. The data within the digital protected identification data packet is encrypted and the digital protected identification data packet includes an encryption key.

The method 144 even further includes sending the protected digital identification data packet (including the data) to an identified and secure source (e.g., server or computing device) of the entity (block 152). In addition, the data privacy management system 12 may also provide the entity the encryption key to decrypt the data within the digital identification data packet (e.g., upon the entity confirming its identity).

The method 144 yet further includes receiving and confirming the data within the protected digital identification data packet at the entity (block 154). The method 144 includes automatically causing alteration of the data by altering an encryption key of the protected digital identification data packet to prevent further access to the data (block 156). Once alteration of the data occurs, the method 144 includes sending a confirmation to the individual that the data has been received and confirmed by the entity and that alteration of the encryption key has occurred to prevent further access (block 158).

Figure 9:
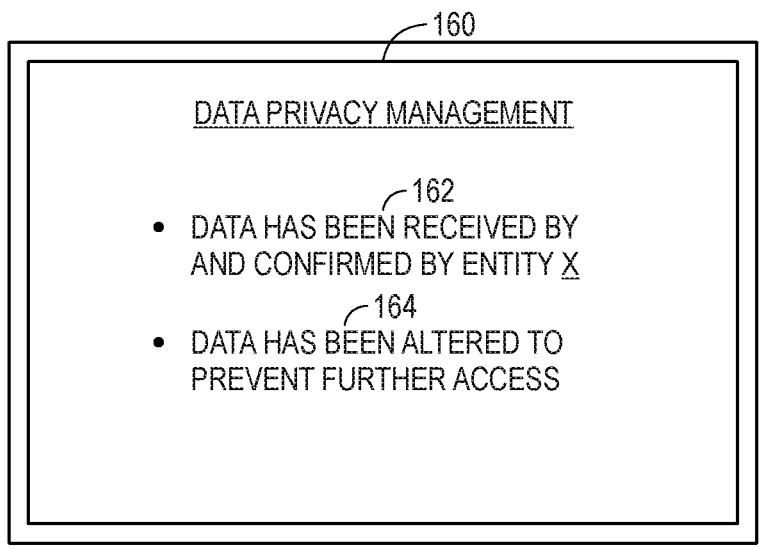
FIG. 9 is a schematic diagram of a user interface presented to a user for providing information related to a status of provided data, in accordance with aspects of the present disclosure.

FIG. 9 is a schematic diagram of a user interface 160 presented to a user (e.g., on a display of the user's device) for providing information related to a status of provided data. As depicted, the user interface 160 shows a notification 162 of a confirmation that the data sent by the individual has been received by and confirmed by the entity. Also, as depicted, the user interface 160 shows a notification 164 of a confirmation that the data been altered (e.g., deleted or encryption key changed) to prevent further access.

Figure 10:
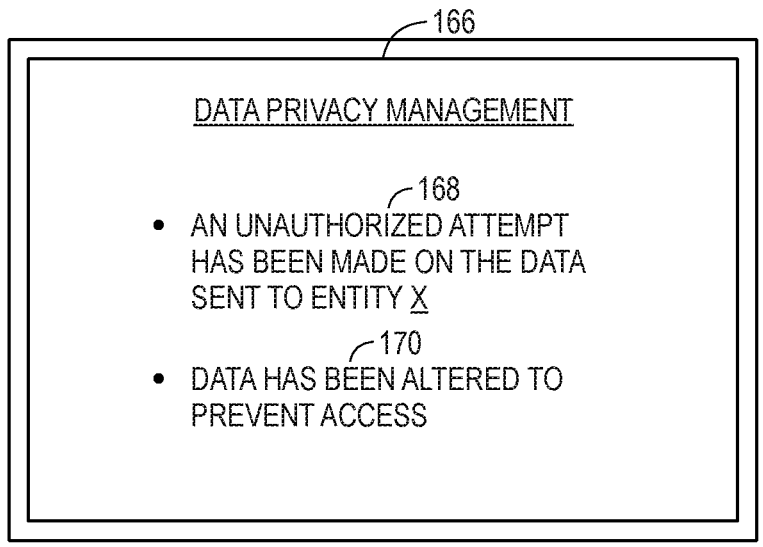
FIG. 10 is a schematic diagram of a user interface presented to a user for providing information related to a status of provided data (e.g., in response to unauthorized attempt to access data), in accordance with aspects of the present disclosure.

FIG. 10 is a schematic diagram of a user interface 166 presented to a user (e.g., on a display of the user's device) for providing information related to a status of provided data (e.g., in response to unauthorized attempt to access data). As depicted, the user interface 166 shows a notification 168 that an unauthorized attempt was made to access the data sent to the entity. Also, as depicted, the user interface 166 shows a notification 170 of a confirmation that the data been altered (e.g., deleted or encryption key changed) to prevent access.

Figure 11:
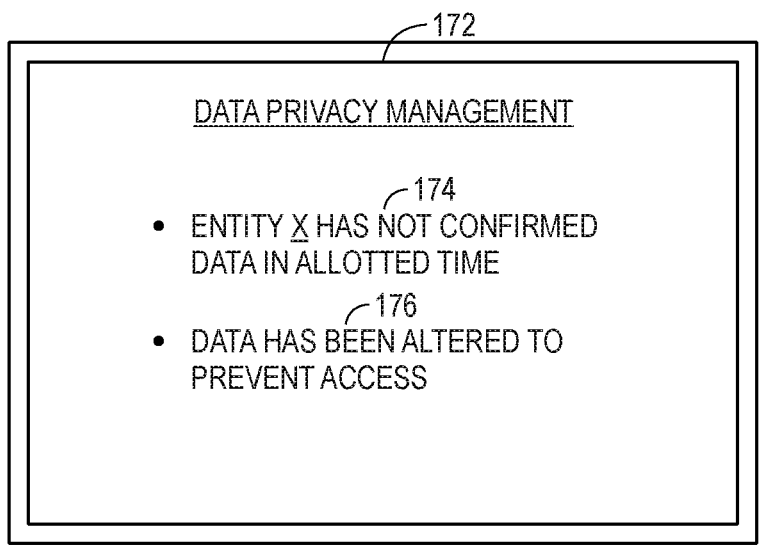
FIG. 11 is a schematic diagram of a user interface presented to a user for providing information related to a status of provided data, (e.g., in response to lack of confirmation in allotted time), in accordance with aspects of the present disclosure.

FIG. 11 is a schematic diagram of a user interface 172 presented to a user (e.g., in response to lack of confirmation in allotted time) for providing information related to a status of provided data (e.g., in response to unauthorized attempt to access data). As depicted, the user interface 172 shows a notification 174 that the entity that the data was sent to has not confirmed the data in set amount of time allotted for confirmation. Also, as depicted, the user interface 172 shows a notification 176 of a confirmation that the data been altered (e.g., deleted or encryption key changed) to prevent access.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium, comprising processor-executable code that when executed by a processor, causes the processor to:
   receive a request for an individual to provide data to an entity;
   identify the data of the individual to share with the entity;
   collect the data in a protected digital identification data packet;
   send the protected digital identification data packet to an identified and secure source of the entity;
   receive and confirm the data in the protected digital identification data packet at the source of the entity;
   automatically cause deletion of the data based on confirmation of the data to prevent further access to the data;
   send a first confirmation to the individual that the data has been received and confirmed by the entity and that the data has been deleted to prevent further access;
   automatically cause deletion of the data to prevent further access to the data when an unauthorized entity or unauthorized individual attempts to access the data prior to confirmation of data; and
   send a second confirmation to the individual that an attempt was made by the unauthorized entity and the unauthorized individual to access the data prior to confirmation of the data and that the data has been deleted to prevent access.

* * * * *